United States Patent
Ham et al.

(10) Patent No.: US 7,488,430 B2
(45) Date of Patent: Feb. 10, 2009

(54) METHOD OF FABRICATING IN-PLANE SWITCHING MODE LCD

(75) Inventors: Yong Sung Ham, Anyang-si (KR); Yun Bok Lee, Seoul (KR)

(73) Assignee: LG Display Co., Ltd., Seoul (KR)

( * ) Notice: Subject to any disclaimer, the term of this patent is extended or adjusted under 35 U.S.C. 154(b) by 1073 days.

(21) Appl. No.: 10/807,456

(22) Filed: Mar. 24, 2004

(65) Prior Publication Data

US 2004/0247798 A1    Dec. 9, 2004

(30) Foreign Application Priority Data

Mar. 24, 2003  (KR) .................. 10-2003-0018079
Jun. 5, 2003   (KR) .................. 10-2003-0036186

(51) Int. Cl.
*C30B 33/00* (2006.01)
(52) U.S. Cl. .................. 216/23; 216/66; 349/123; 349/143; 427/58
(58) Field of Classification Search .............. 427/58, 427/66; 216/23; 349/123, 143
See application file for complete search history.

(56) References Cited

U.S. PATENT DOCUMENTS

| | | | |
|---|---|---|---|
| 5,030,322 A | 7/1991 | Shimada et al. | |
| 5,770,826 A | 6/1998 | Chaudhari et al. | |
| 5,856,854 A * | 1/1999 | Hyun | 349/43 |
| 6,020,946 A | 2/2000 | Callegari et al. | |
| 6,061,114 A | 5/2000 | Callegari et al. | |
| 6,061,115 A | 5/2000 | Samant et al. | |
| 6,124,914 A | 9/2000 | Chaudhari et al. | |
| 6,195,146 B1 | 2/2001 | Chaudhari et al. | |
| 6,313,896 B1 | 11/2001 | Samant et al. | |
| 6,331,381 B1 | 12/2001 | Chaudhari et al. | |
| 6,346,975 B2 * | 2/2002 | Chaudhari et al. | 349/124 |
| 2002/0051109 A1 * | 5/2002 | Nakanishi et al. | 349/147 |

FOREIGN PATENT DOCUMENTS

JP        09-230351        2/1996

* cited by examiner

*Primary Examiner*—Shamim Ahmed
(74) *Attorney, Agent, or Firm*—McKenna Long & Aldridge LLP

(57) ABSTRACT

A fabrication method of an IPS mode LCD including forming a pixel electrode and a common electrode on a first substrate; forming a passivation layer on the pixel electrode and common electrode; forming a black matrix layer on a second substrate; forming a color filter layer on the black matrix layer; forming an overcoat layer on the color filter layer; and irradiating an ion beam on the passivation film on the first substrate and the overcoat layer on the second substrate to perform an orientation treatment of the passivation film and the overcoat layer. The common electrode, the pixel electrode, the gate line and the data line are formed in a stripe configuration or a zigzag configuration. In a zigzag configuration, there is at least one bent portion in the configuration.

6 Claims, 11 Drawing Sheets

METHOD OF FABRICATING IN-PLANE SWITCHING MODE LCD

This application claims the benefit of Korean Patent Application No. 10-2003-0018079 filed Mar. 24, 2003 and Application No. 10-2003-0036186 filed Jun. 5, 2003, which are hereby incorporated by reference for all purposes as if fully set forth herein.

BACKGROUND OF THE INVENTION

1. Field of the Invention

The present invention relates to a liquid crystal display (LCD). More particularly, the present invention relates to a fabrication method for an in-plane switching (IPS) mode LCD to drive the liquid crystal using a horizontal electric field.

2. Description of the Related Art

Generally, cathode ray tubes (CRT) have been most widely used among display devices to display image information on a screen. However, there are inconveniences associated with use of the CRT because of its large volume and weight compared with the display area.

With the development of electronic industries usage of display devices is expanding. Previous usage was limited, for example, to a TV Braun tube, for example, to the personal computer, a notebook, a wireless terminal, a vehicle instrument panel, and an electronic display board. Also, with the development of information communication technology and the ability to transmit large capacity image information, the need for a next generation display device capable of processing and displaying the large capacity image information increases.

Such a next generation display device is required to be lighter, thinner, shorter and smaller and to have a high luminance, a large-sized screen, a low power consumption and a low price. Among such next generation display devices, the liquid crystal display (LCD) is gaining popularity.

The LCD has a better resolution than other flat displays and a faster response time in implementing a moving picture when compared to the CRT.

A twisted nematic (TN) mode LCD is an example of a LCD that is widely used at the present time. In the TN mode LCD, after electrodes are respectively formed on two substrates and liquid crystal directors are twisted and aligned by 90°, a driving voltage is applied to the electrodes to drive the liquid crystal directors.

However, the TN mode LCD has a serious drawback of a narrow viewing angle.

Recently, LCDs employing new modes are being actively researched so as to solve the drawback of the narrow viewing angle. As examples of the new mode, there are in-plane switching (IPS) mode, optically compensated birefringence (OCB) mode, etc.

The IPS mode LCD generates a horizontal electric field to drive the liquid crystal molecules in a horizontal state with respect to the substrates by forming two electrodes on the same substrate and applying a voltage between the two electrodes. In other words, the longer axis of the liquid crystal molecule does not stand up with respect to the substrates.

To this end, the PS mode LCD has a small variation in the birefringence of liquid crystal according to a viewing direction or viewing angle and thus has an excellent viewing angle characteristic when compared with the TN mode LCD.

Hereinafter, the related art in-plane switching (IPS) mode LCD will be described in detail with reference to the accompanying drawings.

FIG. 1 is a sectional view of a related art IPS mode LCD.

Referring to FIG. 1, an IPS mode LCD is formed by attaching a first substrate 118 and a second substrate 119 facing the first substrate 118, and interposing a liquid crystal layer 130 therebetween. A metal film is first deposited on the first substrate 118 and is patterned to form a plurality of gate lines and a plurality of gate electrodes 109 branched from the respective gate lines and formed at a thin film transistor region.

Next, a gate insulating layer 120 is formed on an entire surface of the first substrate including the gate electrode 109, and then a semiconductor layer 115 forming an ohmic contact layer with an active layer 115a is formed on a predetermined region of the gate insulating layer 120.

A data line is formed 110 on the gate insulating layer 120 and forms a matrix configuration together with the gate line.

In the course of forming the data line 110, a source electrode 116 and a drain electrode 117 of a thin film transistor.

A common line and a common electrode 113 are formed to be parallel with the data line 110.

A passivation film 128 is formed on the entire surface of the first substrate 118 constructed as above.

After that, a pixel electrode 114 is formed to be electrically connected with the drain electrode 117 and parallel to the data line 110.

A first orientation film 129 is formed on the entire surface of the first substrate 118 constructed as above.

On the other hand, a black matrix 121 for preventing a light from being leaked is formed on the second substrate. A color filter layer 122 consisting of color patterns of red (R), green (G), and blue (B) is formed between the black matrixes 121.

An overcoat layer 123 is formed on the color filter layer 122 for planarizing an upper surface thereof and protecting the underlying color filter layer 122 is formed.

Next, a second orientation film 126 is formed on the overcoat layer 123.

The fabrication method of the IPS mode LCD constructed as above will be described with reference to FIG. 2.

First, upper and lower substrates of the IPS mode LCD having the construction described in FIG. 1 are fabricated (S100).

Next, a cleaning step (S110) is performed to remove foreign substances on the upper and lower substrates on which various patterns are formed. After that, an orientation film-forming step (S120) for printing polyimide (PI) of raw material of the orientation film on the upper and lower substrates is performed.

Afterwards, an orientation film-baking step (S130) is performed in which a high temperature heat is applied to the printed polyimide to vaporize a solvent and harden the polyimide.

Next, an orientation film-rubbing step (S140) is performed in which an upper surface of the baked orientation film is rubbed in a predetermined direction using a rubbing apparatus to form a groove.

After the orientation film-forming step (S120) is completed, a seal pattern is formed as an adhesive at an edge of the upper substrate except for a liquid crystal injection inlet, and a spacer is scattered on the lower substrate (S150).

Next, the two prepared substrates are attached to each other with a spacing therebetween. During the attachment of the two substrates, a preciseness of a few micrometers is required to prevent light from being leaked when the preciseness is out of the given value (S160).

After (S160), a cell-cutting step (S170) is performed for cutting the opposing attached substrates into a plurality of unit cells. The cell-cutting step (S170) is performed to cut the completely attached substrates to a necessary size, and includes a scribing step for forming a cutting line on the outer surfaces of the upper and lower substrates, and a breaking step for dividing the attached substrates into the unit cells by applying a crack on the scribed line.

Finally, a liquid crystal is injected into a space between the two substrates cut in a unit cell, and a liquid crystal injection inlet is sealed to prevent the injected liquid crystal from being leaked, thereby completing an LCD (S180).

In the above LCD, the liquid crystal has a physical characteristic that varies with the alignment state of the liquid crystal molecules. The physical characteristic of the liquid crystal causes a difference in the response by an external force such as an electric field.

Because of the aforementioned property of the liquid crystal molecules, it is important to control the alignment of the liquid crystal molecules for the research on the physical property of the liquid crystal molecules and constitution of the LCD.

The rubbing process for allowing the liquid crystal molecules to be aligned uniformly is an important factor to determine the normal operation of the LCD and the uniform display characteristic of the screen, and many researches related with the rubbing process have been made.

The orientation film forming process for determining the initial alignment direction of the liquid crystal molecules will be described in more detail hereinafter.

First, the orientation film forming process includes the steps of coating a polymer film used as a raw material of the orientation film and aligning the coated polymer film in a predetermined direction.

The orientation film mainly uses a polyimide-based organic material, and is aligned by a rubbing method.

The rubbing method includes coating a polyimide-based organic material film on a substrate; vaporizing a solvent contained in the coated polyimide-based organic material film at a temperature of 60-80° C.; hardening the polyimide-based organic material film at a temperature of 80-200° C. to form a polyimide orientation film; and rubbing the polyimide orientation film using a rubbing cloth such as a velvet in a predetermined direction to form an orientation direction.

The above-described rubbing method is advantageous because the orientation treatment is easy, suitable for mass production and capable of stable orientation.

However, usage of a roller having a defective rubbing cloth in the above rubbing process causes a rubbing failure.

In other words, since the rubbing method using such a rubbing cloth is performed by direct contact between the orientation film and the rubbing cloth, various problems may occur, such as contamination of the liquid crystal cell due to the occurrence of particles, fracture of a thin film transistor (TFT) device, the need of an addition cleaning process after the rubbing process, non-uniformity of orientation in a large-sized application, etc., to lower the production yield of the LCD.

SUMMARY OF THE INVENTION

Accordingly, the present invention is directed to a fabrication method of an IPS mode LCD that substantially obviates one or more problems due to limitations and disadvantages of the related art.

An advantage of the present invention is to provide a fabrication method of an IPS mode LCD that simplifies the fabrication process and solves problems related to rubbing failure caused performing the alignment of an orientation film by omitting the printing and rubbing processes of the orientation film and directly irradiating an ion beam onto upper and lower substrates using an ion beam irradiation method.

Additional advantages and features of the invention will be set forth in the description which follows, and in part will become apparent to those having ordinary skill in the art upon examination of the following or may be learned from practice of the invention. The advantages of the invention may be realized and attained by the structure particularly pointed out in the written description and claims hereof as well as the appended drawings.

To achieve these advantages and in accordance with the purpose of the invention, as embodied and broadly described herein, there is provided a fabrication method of an IPS mode LCD, comprising: forming a first electrode and a second electrode on a first substrate; forming a passivation film on the first and second electrodes; and performing an orientation treatment of the passivation film by irradiating an ion beam on the passivation film.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principle of the invention. In the drawings.

DETAILED DESCRIPTION OF THE ILLUSTRATED EMBODIMENTS

The present invention will now be described more fully with reference to the accompanying drawings, in which exemplary embodiments of the invention are shown.

Figure 1:
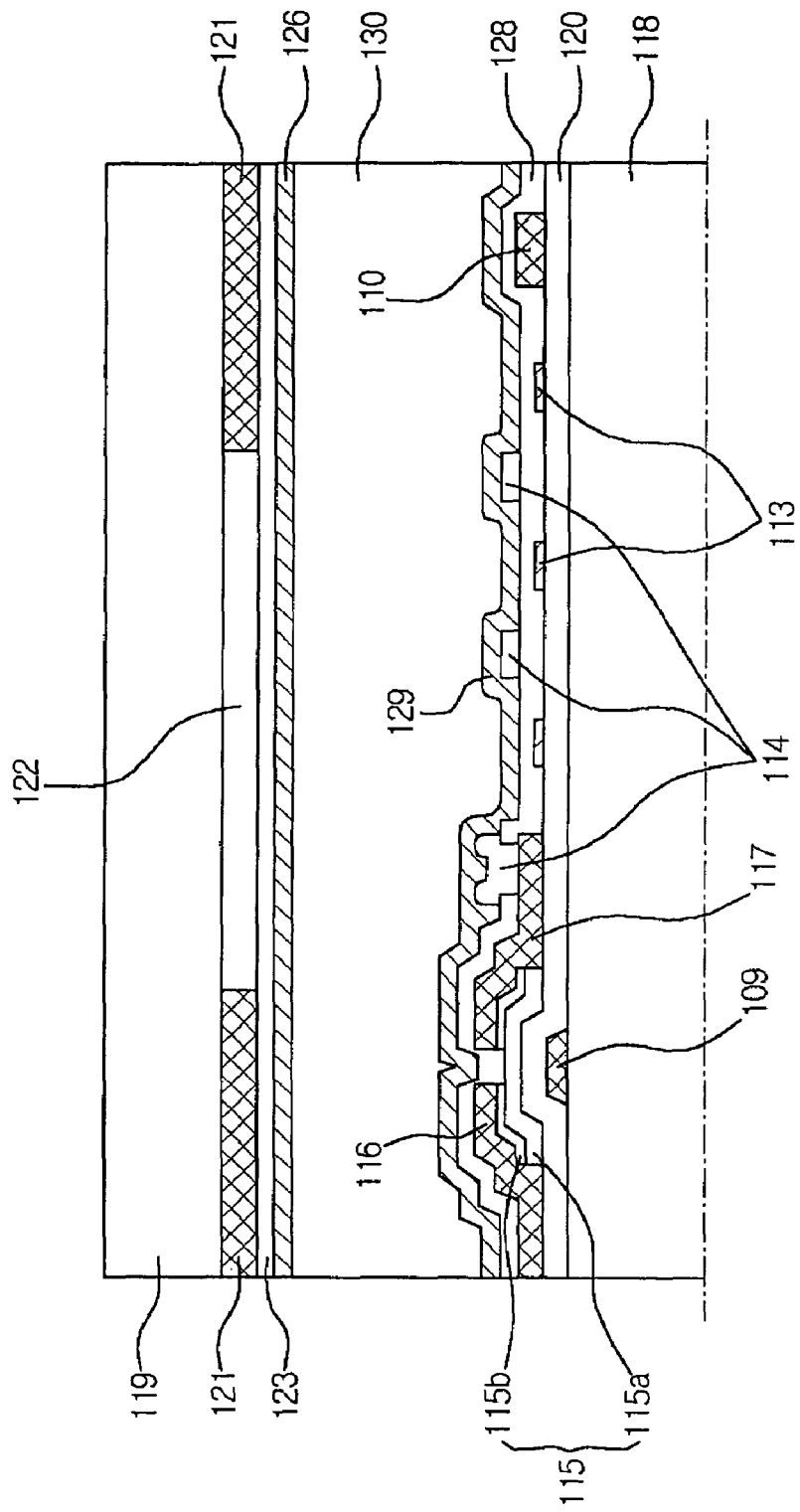
FIG. 1 is a sectional view of an IPS mode LCD according to the related art.
Figure 2:
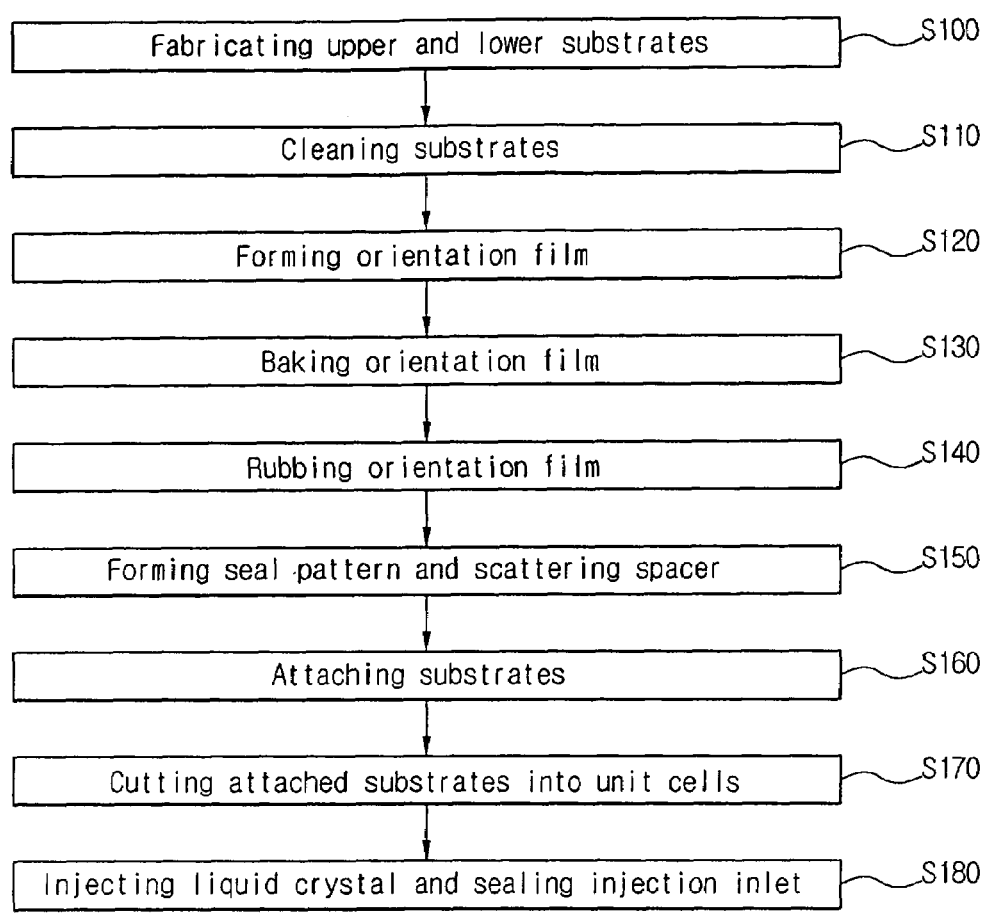
FIG. 2 is a process flow chart illustrating a fabrication method of an IPS mode LCD according to the related art.
Figure 3:
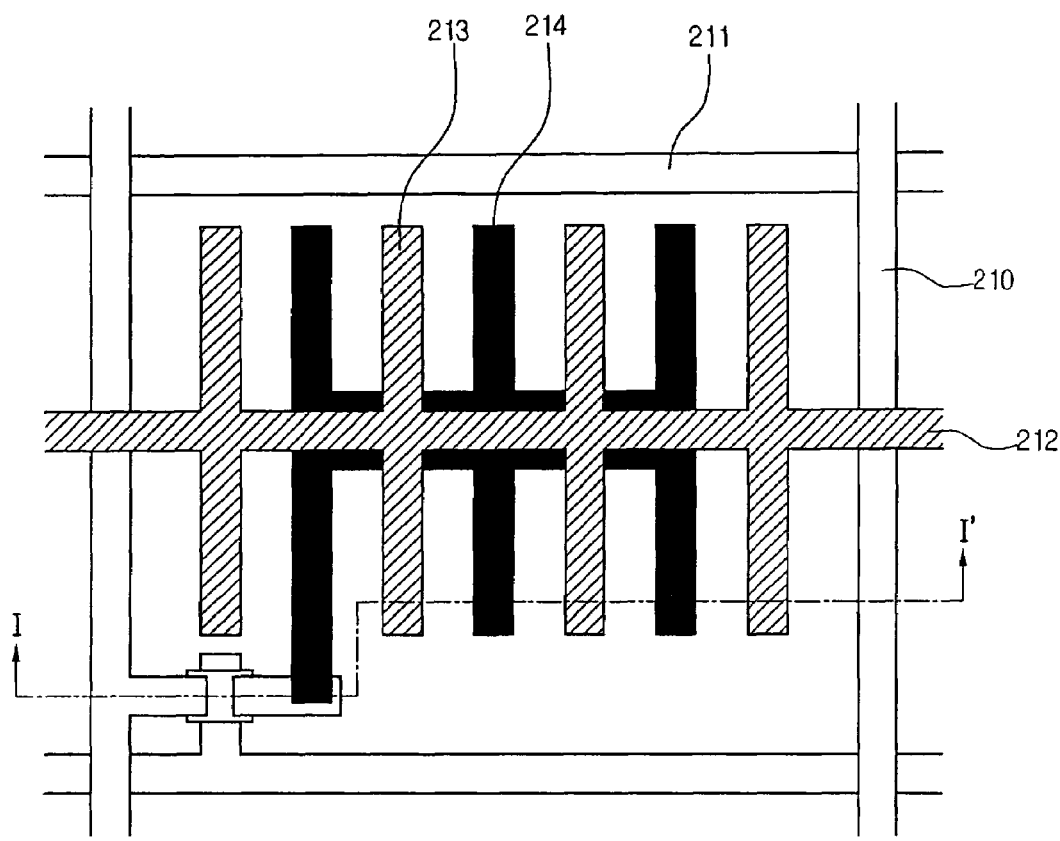
FIG. 3 is a plan view of an IPS mode LCD according to a first embodiment of the present invention.
Figure 4:
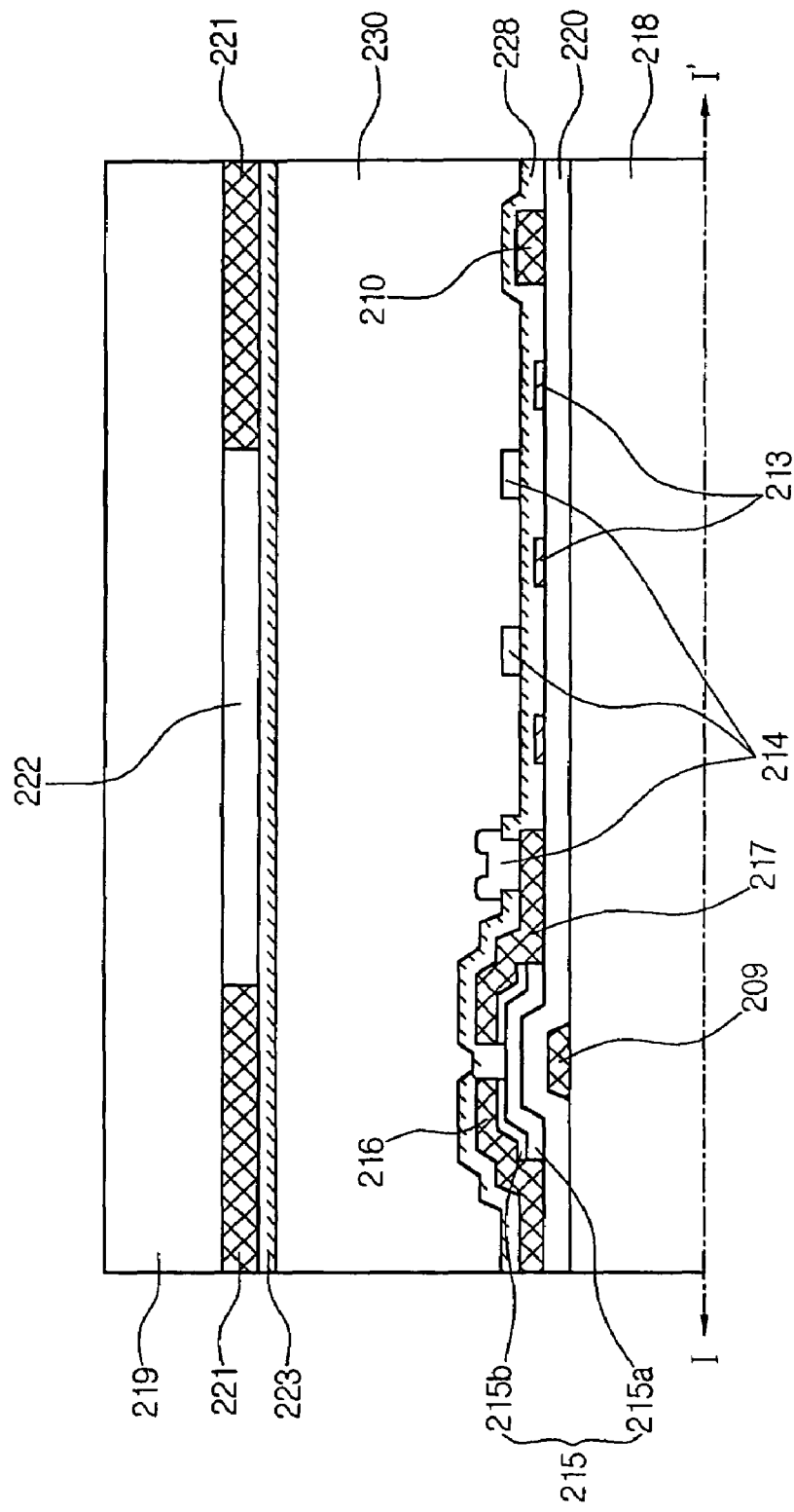
FIG. 4 is a sectional view taken along the line I-I' of FIG. 3.

FIG. 3 is a plan view of an IPS mode LCD according to a first embodiment of the present invention; and FIG. 4 is a sectional view taken along the line I-I' of FIG. 3.

Referring to FIGS. 3 and 4, an IPS mode LCD according to the present invention is configured to include a data line 210 and a gate line 211 arranged on a first substrate 218, for defining a pixel region, a common line 212 arranged in parallel with the gate line 211 within the pixel region, a thin film transistor arranged at a crossing point of the gate line 211 and the data line 210, and a pixel electrode 214 and a common electrode 213 arranged in parallel with the data line 210 within the pixel region.

A passivation film 228 is formed on the first substrate 218 including the common electrode 213 and the pixel electrode 214, and is orientation-treated by irradiating ion beams thereon using an ion beam irradiation apparatus so that liquid crystal molecules may be aligned in a predetermined direction.

The common electrode 213 and the pixel electrode 214 may be, as shown in FIG. 3, formed in a stripe configuration or a zigzag configuration. In a case in which the common electrode 213 and the pixel electrode 214 are formed in a zigzag configuration, the amount of zigzag is not limited and there may be at least one bent portion.

Also, the data line may be formed in a zigzag configuration.

In more detail with reference to FIG. 4, an IPS mode LCD according to a first embodiment of the present invention is fabricated by attaching the first substrate 218 and a second substrate 219 opposing the first substrate 218, and providing a liquid crystal material 230 in a space between the first and second substrates 218 and 219. First, a metal film is deposited on the first substrate 218 and is patterned to form a plurality of gate lines 211 and gate electrodes 209 branched from the respective gate lines at a position of the thin film transistor. Other known configuration of the gate electrodes 209 and gate lines 211 are also possible.

Next, a gate insulating layer 220 is formed on an entire surface of the first substrate 218 including the gate electrode 209. A semiconductor layer 215 having an active layer 215a and an ohmic contact layer 215b is formed on a predetermined area of the gate insulating layer 220.

A plurality of data lines 210 are formed on the gate insulating layer 220 and form a matrix configuration together with the gate lines 211.

Source electrode 216 and drain electrode 217 of a thin film transistor are substantially formed concurrently with the date lines 210.

Common line 212 and common electrode 213 are formed to be substantially parallel with the gate line 211.

After that, a pixel electrode 214 is formed to be electrically connected with the drain electrode 217 and to be substantially parallel with the data lines 210.

At this time, the common electrode 213 and the pixel electrode 214 may be formed on the same layer as the gate electrode or the source/drain electrode, or may be formed on a different layer with an insulating layer interposed therebetween.

Also, the common electrode 213 and the pixel electrode 214 may be formed of (i) a transparent conductive film that allows light to pass therethrough, such as indium tin oxide (ITO) or indium zinc oxide (IZO), or (ii) the same metal as the material of the gate electrode or the source/drain electrode. Further, the common electrode 213 and the pixel electrode 214 may be formed in a single layer or a dual layer.

In the meanwhile, a passivation film 228 is formed on the first substrate 218 constructed as above.

The passivation film 228 is aligned by irradiating an ion beam using an ion beam irradiation apparatus.

A black matrix layer 221 is formed on the second substrate 219 to prevent light from being leaked, and a color filter layer 222 having color filter patterns of red (R), green (G) and blue (B) is formed between the black matrix layer.

The black matrix layer 221 also may be formed on an upper surface of the outermost common electrode among the common electrodes formed within the unit pixel to block an incident light.

An organic overcoat layer 223 is formed on the color filter layer 222 for planarizing an upper surface thereof and protecting the underlying color filter layer 222.

The overcoat layer 223 has an upper portion, which is aligned by irradiating an ion beam thereon.

The passivation film 228 and the overcoat layer 223 may be selected from one of a group consisting of a photo-acryl and a BCB (benzo cyclo butene) which are organic materials, and a silicon oxide (SiOx) and a silicon nitride (SiNx), which are inorganic materials.

The IPS mode LCD according to the present invention may be applied in various electrode configurations. The following FIGS. 5 to 9 are embodiments illustrating various structures of the IPS mode LCDs.

Figure 5:
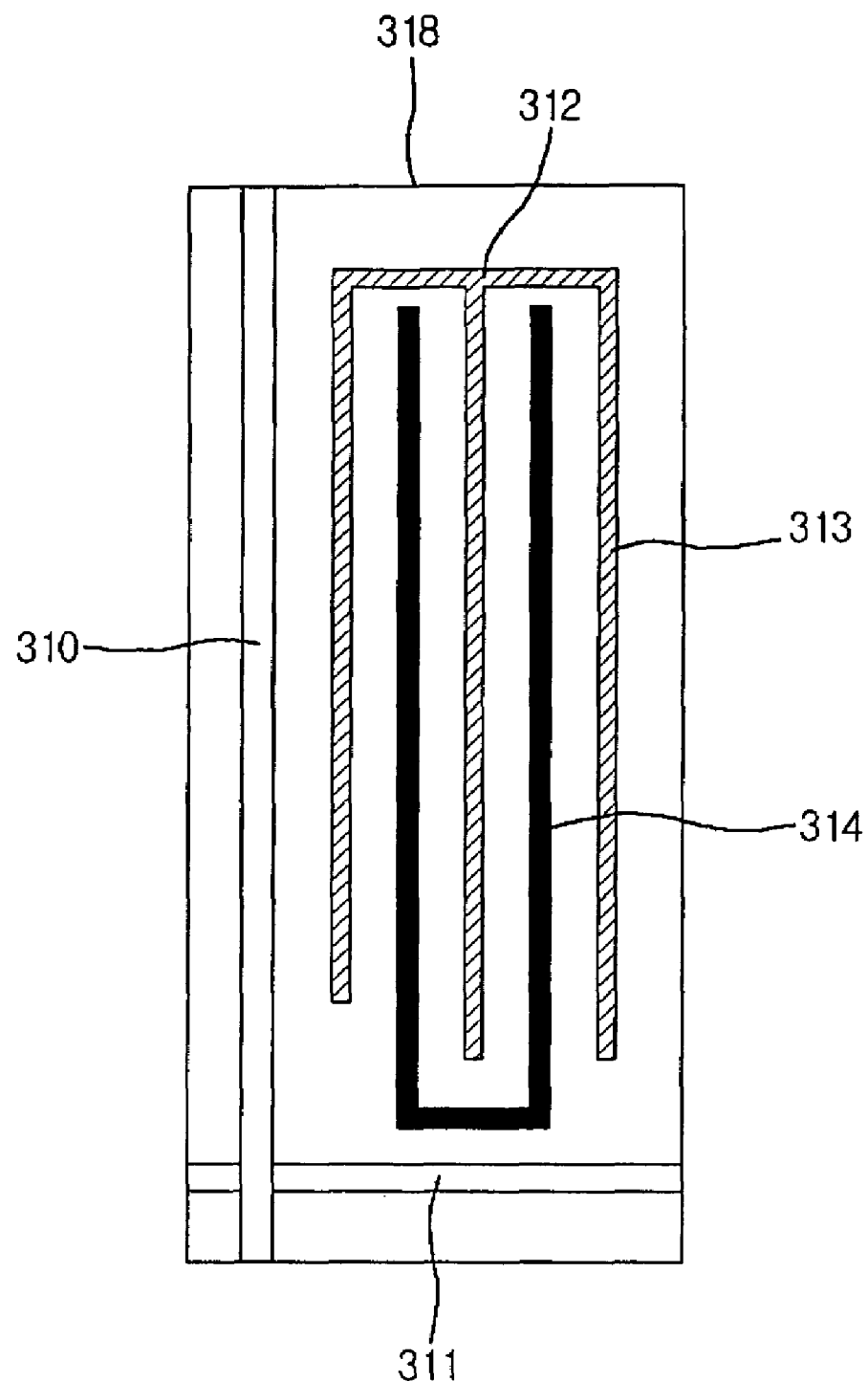
FIG. 5 is a plan view of an IPS mode LCD according to a second embodiment of the present invention.

FIG. 5 is a plan view of an IPS mode LCD according to a second embodiment of the present invention.

As shown in FIG. 5, an IPS mode LCD according to a second embodiment of the present invention is configured to include a data line 310 and a gate line 311 arranged on a first substrate 218, for defining a pixel region, a common line 312 arranged substantially in parallel with the gate line 311 within the pixel region, a thin film transistor arranged at a crossing point of the gate line 311 and the data line 310, and a pixel electrode 314 and a common electrode 313 arranged substantially in parallel with the data line 310 within the pixel region. For simplicity, the connectivity of the thin film transistor within the pixel region is not illustrated, but is similar to FIG. 3.

The data line 310, the pixel electrode 314 and the common electrode 313 are formed in a stripe configuration.

A passivation film formed on the first substrate 318 including the common electrode 313 and the pixel electrode 314 is orientation-treated by irradiating ion beams thereon using an ion beam irradiation apparatus so that liquid crystal molecules may be aligned in a predetermined direction.

Figure 6:
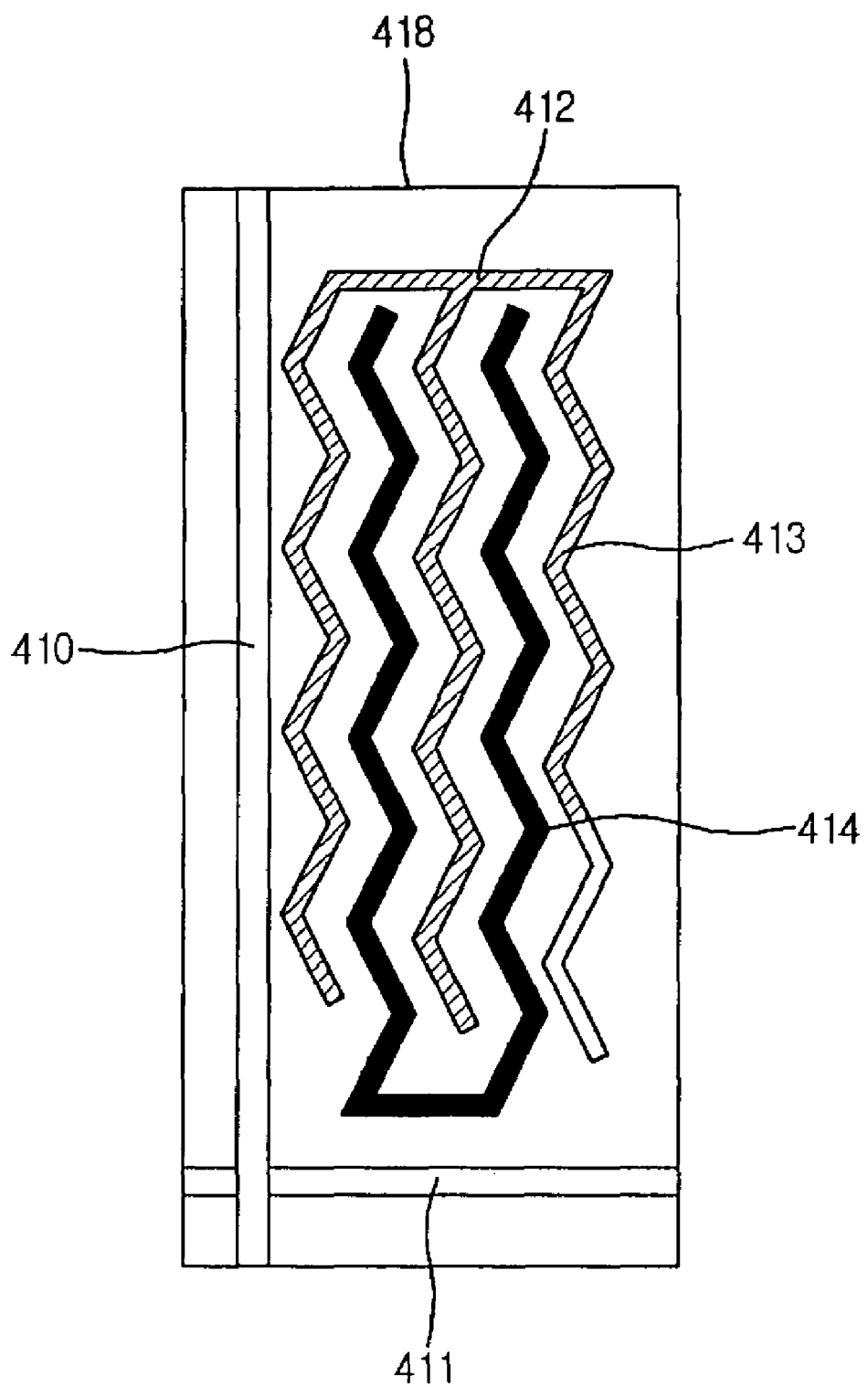
FIG. 6 is a plan view of an IPS mode LCD according to a third embodiment of the present invention.

FIG. 6 is a plan view of an IPS mode LCD according to a third embodiment of the present invention.

Referring to FIG. 6, an IPS mode LCD according to a third embodiment of the present invention is configured to include a data line 410 and a gate line 411 arranged on a first substrate, for defining a pixel region, a common line 412 arranged substantially in parallel with the gate line 411 within the pixel region, a thin film transistor arranged at a crossing point of the gate line 411 and the data line 410, and a pixel electrode 414 and a common electrode 413 arranged substantially in parallel with the data line 410 within the pixel region. For simplicity, the connectivity of the thin film transistor within the pixel region is not illustrated, but is similar to FIG. 3.

Herein, the data line 410 is formed in a stripe configuration, and the pixel electrode 414 and the common electrode 413 are formed in a zigzag configuration having at least one bent portion.

A passivation film formed on the first substrate 418 including the common electrode 413 and the pixel electrode 414 is orientation-treated by irradiating an ion beam thereon using an ion beam irradiation apparatus so that liquid crystal molecules may be aligned in a predetermined direction.

Figure 7:
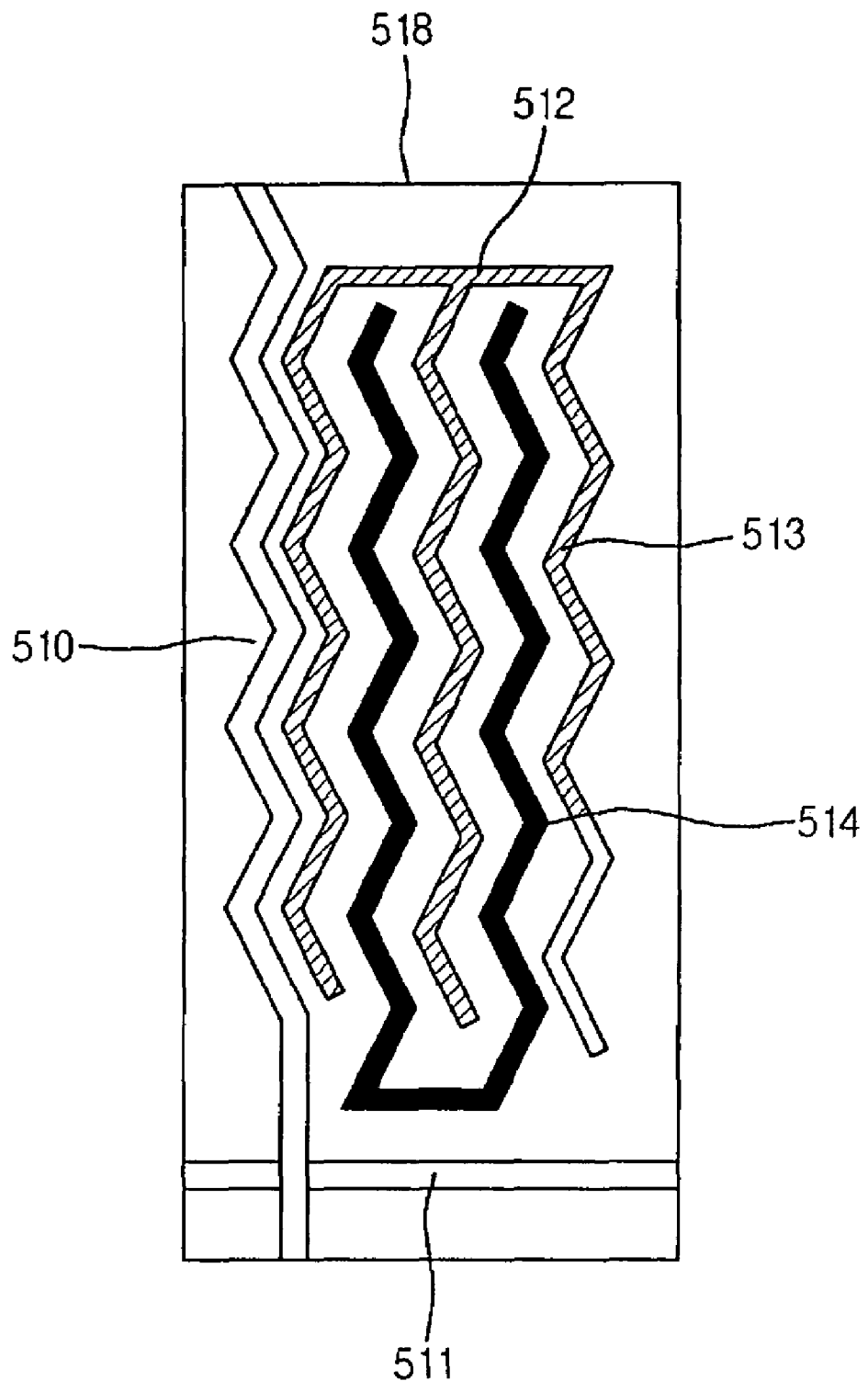
FIG. 7 is a plan view of an IPS mode LCD according to a fourth embodiment of the present invention.

FIG. 7 is a plan view of an IPS mode LCD according to a fourth embodiment of the present invention.

Referring to FIG. 7, an IPS mode LCD according to a fourth embodiment of the present invention is configured to include a data line 510 and a gate line 511 arranged on a first substrate 518, for defining a pixel region, a common line 512 arranged substantially in parallel with the gate line 511 within the pixel region, a thin film transistor arranged at a crossing point of the gate line 511 and the data line 510, and a pixel electrode 514 and a common electrode 513 arranged substantially in parallel with the data line 510 within the pixel region. For simplicity, the connectivity of the thin film transistor within the pixel region is not illustrated, but is similar to FIG. 3.

In FIG. 7, the data line 510, the pixel electrode 514 and the common electrode 513 are formed in a zigzag configuration having at least one bent portion.

A passivation film formed on the first substrate 518 including the common electrode 513 and the pixel electrode 514 is orientation-treated by irradiating an ion beam thereon using an ion beam irradiation apparatus so that liquid crystal molecules may be aligned in a predetermined direction.

Figure 8:
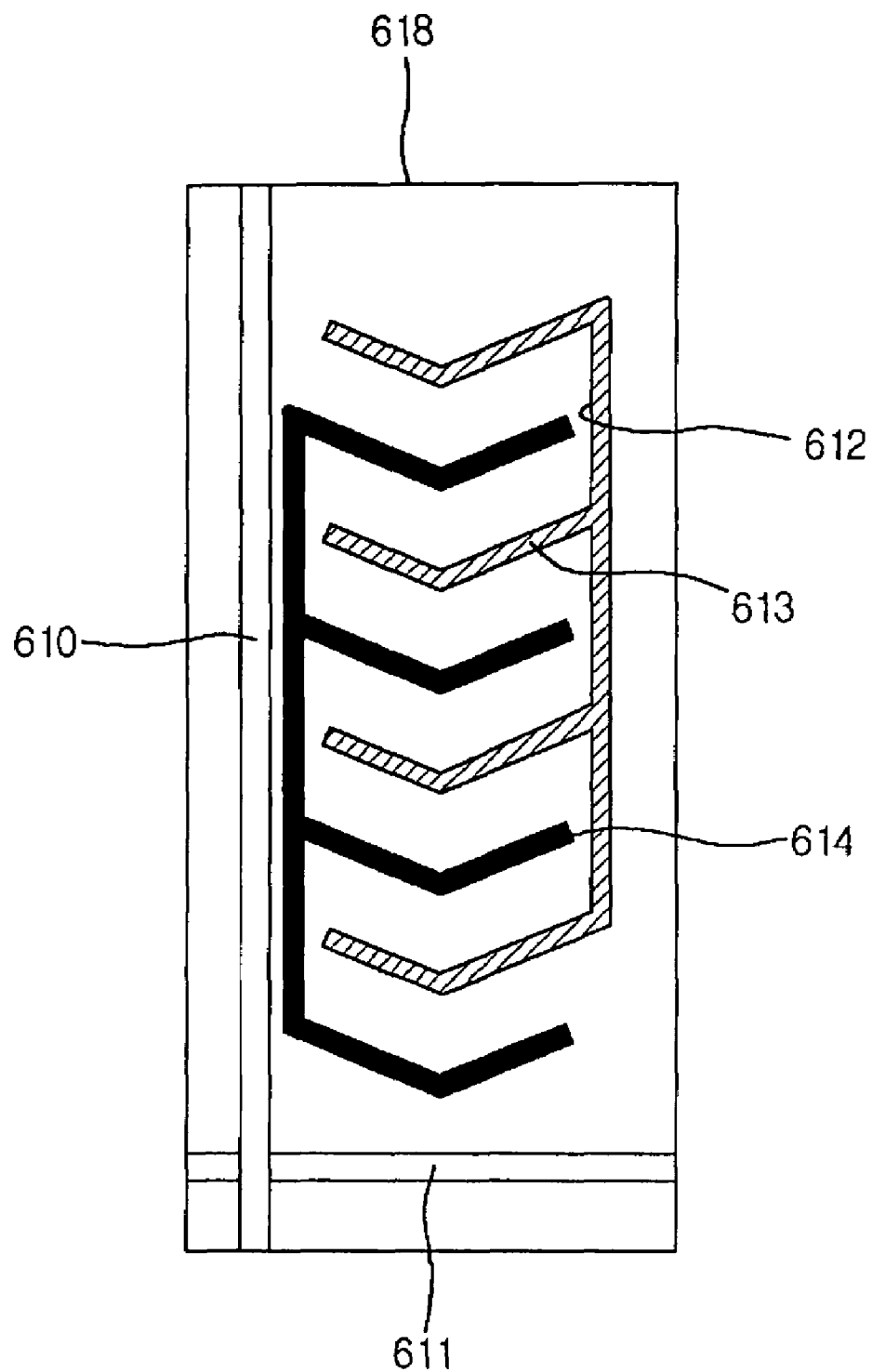
FIG. 8 is a plan view of an IPS mode LCD according to a fifth embodiment of the present invention.

FIG. 8 is a plan view of an IPS mode LCD according to a fifth embodiment of the present invention.

Referring to FIG. 8, an IPS mode LCD according to a fifth embodiment of the present invention is configured to include a data line 610 and a gate line 611 arranged on a first substrate 618, for defining a pixel region, a common line 612 arranged substantially in parallel with the gate line 611 within the pixel region, a thin film transistor arranged at a crossing point of the gate line 611 and the data line 610, and a pixel electrode 614 and a common electrode 613 arranged substantially in parallel with the data line 610 within the pixel region. For simplicity, the connectivity of the thin film transistor within the pixel region is not illustrated, but is similar to FIG. 3.

Herein, the data line 610 is formed in a stripe configuration, and the pixel electrode 614 and the common electrode 613 are formed in a zigzag configuration having at least one bent portion.

A passivation film formed on the first substrate 618 is orientation-treated by irradiating an ion beam thereon using an ion beam irradiation apparatus so that liquid crystal molecules may be aligned in a predetermined direction.

Figure 9:
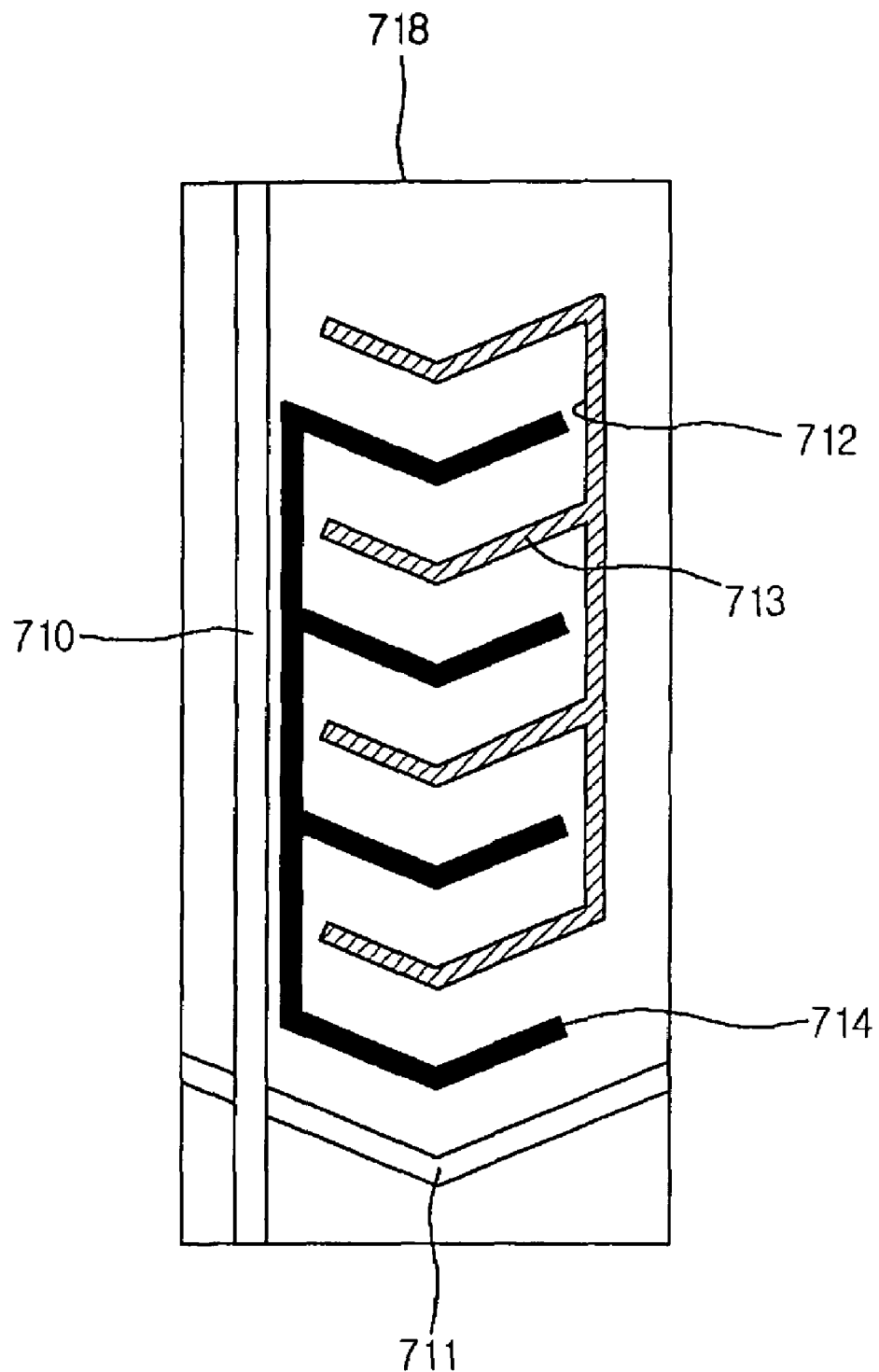
FIG. 9 is a plan view of an IPS mode LCD according to a sixth embodiment of the present invention.

FIG. 9 is a plan view of an IPS mode LCD according to a sixth embodiment of the present invention.

Referring to FIG. 9, an IPS mode LCD according to a sixth embodiment of the present invention is configured to include a data line 710 and a gate line 711 arranged on a first substrate 718, for defining a pixel region, a common line 712 arranged substantially in parallel with the gate line 711 within the pixel region, a thin film transistor arranged at a crossing point of the gate line 711 and the data line 710, and a pixel electrode 714 and a common electrode 713 arranged substantially in parallel with the data line 710 within the pixel region. For simplicity, the thin film transistor within the pixel region is not illustrated, but is similar to FIG. 3.

In FIG. 9, the data line 710, and the pixel electrode 714 and the common electrode 713 that are roughly arranged in parallel with the gate line 711 are formed in a zigzag configuration having at least one bent point.

A passivation film formed on the first substrate 718 is orientation-treated by irradiating ion beam thereon using an ion beam irradiation apparatus so that liquid crystal molecules may be aligned in a predetermined direction.

Figure 10:
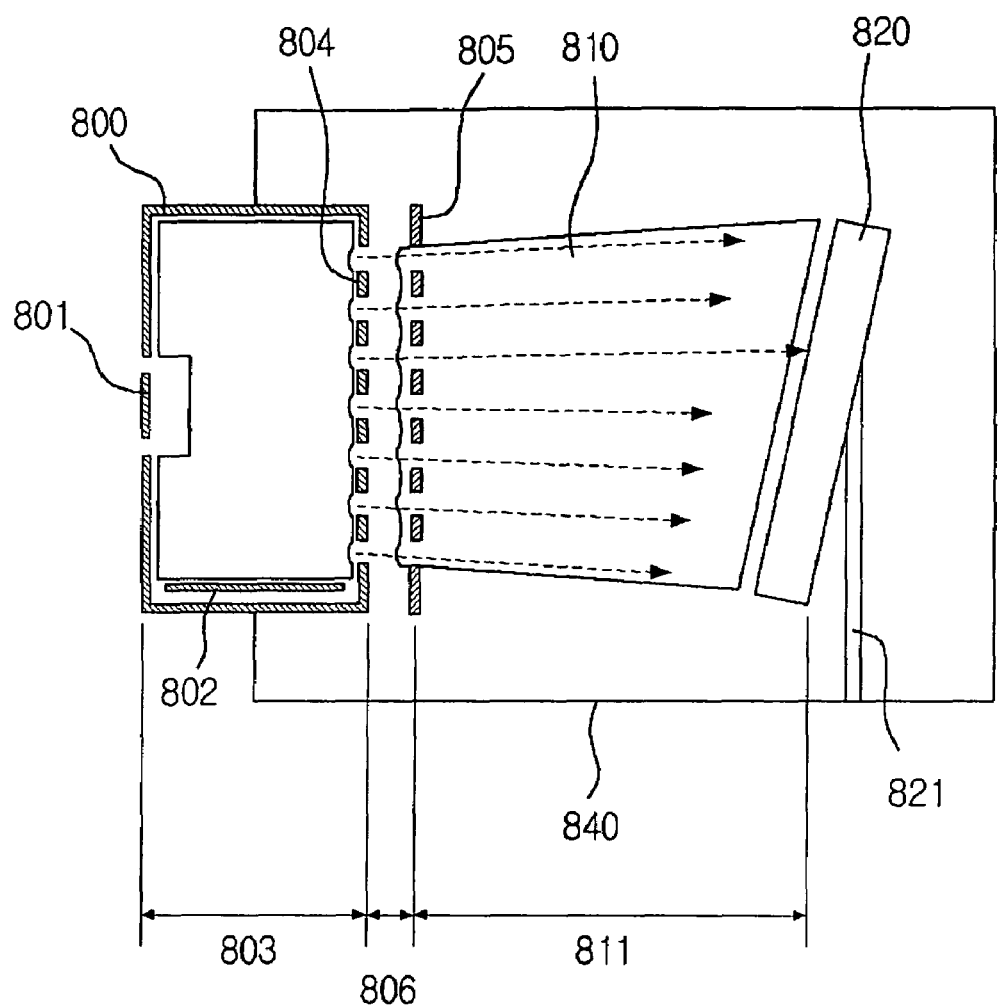
FIG. 10 is a view schematically showing an ion beam irradiation apparatus.

As described above, the orientation treatment in the upper and lower substrates of the IPS mode LCD having a variety of structures is performed using an ion beam irradiation apparatus. Certainly, one of skill in the art would appreciate that the embodiments described above are merely exemplary and that the ion beam irradiation method and apparatus described herein would be applicable to other configurations of LCDs and, in particular, IPS LCDs. FIG. 10 is a view that schematically shows the beam irradiation apparatus. With reference to FIG. 10, the orientation method using the ion beam irradiation apparatus of FIG. 10 will be described below.

First, a first substrate and a second substrate opposing the first substrate are fabricated and prepared. The first substrate has a thin film transistor and a pixel electrode formed thereon, and the second substrate has a black matrix and a color filter layer formed thereon. The prepared first and second substrates are loaded on the ion beam irradiation apparatus, and then an ion beam is irradiated onto each of the first and second substrates.

The following embodiments describe the ion beam irradiation apparatus in detail, but the present invention is not limited thereto.

As shown in FIG. 10, the ion beam irradiation apparatus is configured to irradiate an ion beam on a substrate 820 fixed to a holder 821 inside a vacuum chamber 840. At this time, the substrate 820 may be the first substrate and/or the second substrate described above. In a case of the first substrate, the passivation film (see numeral 228 of FIG. 4) is formed thereon, while in a case of the second substrate, the overcoat layer (see numeral 223 of FIG. 4) is formed thereon.

The ion beam irradiation apparatus may be configured to include an ion beam source 800 having a cathode 801, an anode 802, an ion beam extracting medium 804 and an ion beam acceleration medium 805, a vacuum chamber 840 allowing the ion beam 810 generated from the ion beam source 800 to be irradiated substantially in a straight line to the substrate 820, and a holder 821 for fixing the substrate 820 so that the substrate 820 may be maintained at a predetermined angle within the vacuum chamber 840.

And, the ion beam irradiation apparatus includes three regions. Ions are generated in the discharge plasma region 803, accelerated through the extraction region 806, and travel through the beam plasma region 811.

Ions are generated in the discharge plasma region 803 by electron bombardment of neutral gas atoms. Electrons are emitted by a hot filament, cathode 801, and accelerated by a potential difference between the cathode 801 and anode 804. Before the discharge starts, the source body is at the anode 804 potential. After the discharge starts, however, the connecting resistor, not shown, allows the source body and the ion beam extracting medium 804 to float to the cathode potential, directing the discharge current to the anode. The discharge plasma region 803 establishes itself between the cathode 801, anode 802, chamber walls and the ion beam extracting medium 804.

To extract the ion beam from the discharge plasma region 803, we raise the anode voltage to a positive voltage above ground. Raising the anode potential increases the plasma potential to nearly the same value. Thus, any ion leaving the discharge plasma and striking the substrate 820 surface arrives with the energy determined by the anode potential. The ion beam acceleration medium 805 is held at a negative potential and the ions pass through the apertures in the accelerator grid without striking it and form a collimated ion beam 810, eventually striking the substrate 820 which is held at ground potential.

Although not shown in the drawing of FIG. 10, the ion beam irradiation apparatus may be provided with a shutter between the ion beam source 800 and the substrate so as to adjust the irradiation time of an ion beam to the substrate 820.

The ion beam source 800 generates an ion and an ion beam. Specifically, injected gas is electrically ionized by a voltage different between the cathode 801 and the anode 802 to generate plasma including electrons and ions. The ions of the plasma are extracted as the ion beam 810 while passing through the ion beam extracting medium 804.

The ion beam 810 extracted from the discharged plasma is accelerated by an action of an electric field applied to the ion beam acceleration medium 805 and is then irradiated on the substrate 820 at a predetermined angle.

The energy of the ion beam may be in a range of about 200-4,000 eV.

The substrate 820 is inclined at a predetermined angle with respect to the irradiated ion beam 810. By inclining the substrate 820 and using the ion beam, it is possible to allow the orientation film to have a desired orientation direction and a desired pretilt angle. In the irradiation of the ion beam, the irradiating angle is set in a range of about 0-90° with respect to the irradiated ion beam 810.

An organic material, such as a photo-acryl and a BCB (benzo cyclo butene), or an inorganic material, such as a silicon oxide (SiOx) and a silicon nitride (SiNx), is coated on the substrate 820. These materials chemically or physically react with each other so that the liquid crystal molecules are aligned to have a predetermined direction.

In particular, the material coated on the substrate 820 may be one selected from a group consisting of polyimide (PI), polyamide, polyurethane, polyurea, SiC, $SiO_2$, DLC (Diamond Like Carbon), glass, $Si_3N_4$, $Al_2O_3$, $SnO_2$, $CeO_2$, and $ZnTiO_2$.

In a case in which the substrate 820 is the first substrate, the aforementioned material may be formed as the passivation film. Meanwhile, in a case in which the substrate 820 is the second substrate, the aforementioned material may be formed as the overcoat layer. By irradiating an ion beam onto the passivation film or the overcoat layer, the passivation film and the overcoat layer may function as the orientation film.

Thus, a separate orientation film is not printed, but an ion beam is irradiated onto an organic film or an inorganic film formed as the passivation film and the overcoat layer, thereby allowing the irradiated organic film or inorganic film to perform the function as the orientation film.

Figure 11:
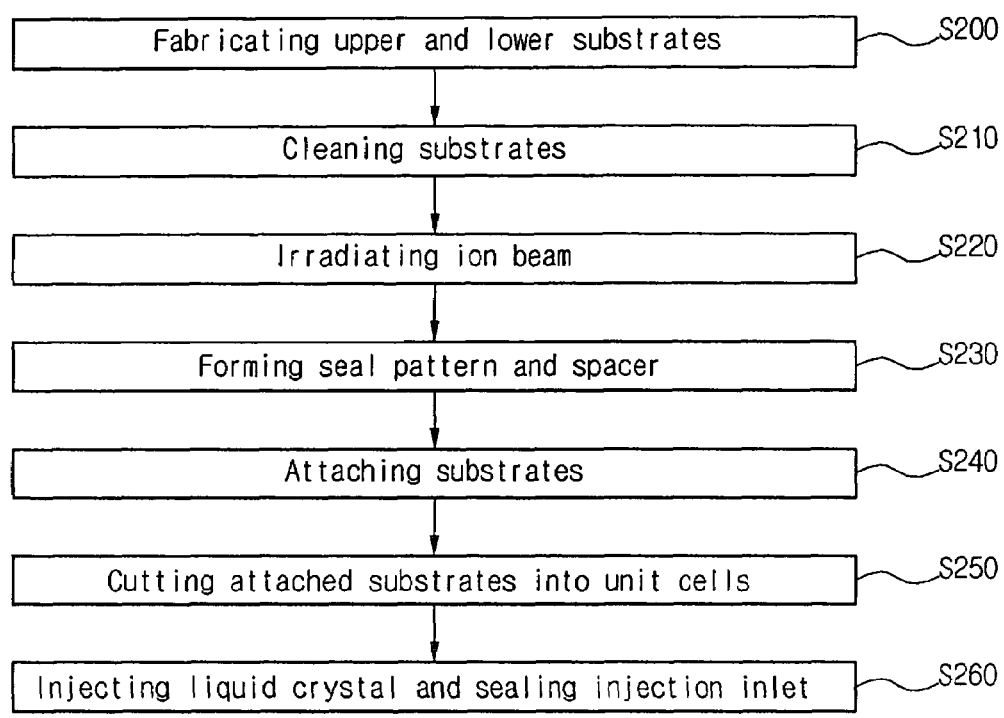
FIG. 11 is a process flow chart illustrating a fabrication method of an IPS mode LCD according to the present invention.

FIG. 11 is a process flow chart illustrating a fabrication method of an IPS mode LCD according to the present invention.

In the IPS mode LCD according to the present invention, the first substrate (or lower substrate) including the pixel electrode and the common electrode is provided thereon with the passivation film, and the second substrate (or upper substrate) opposing the first substrate and including the black matrix layer and the color filter layer is provided thereon with the overcoat layer. Each of the passivation film and the overcoat layer is formed of one selected from the group consisting of a photo-acryl and a BCB, which are organic materials, and a silicon oxide (SiOx) and a silicon nitride (SiNx), which are inorganic materials.

The fabrication method of the IPS mode LCD constructed as above will be described with reference to FIG. 11.

At S200, upper and lower substrates of the IPS mode LCD are fabricated.

At S210, the upper and lower substrates are cleaned to remove foreign substances.

At S220, the cleaned substrates are loaded on the ion beam irradiation apparatus and then an orientation treatment of the inorganic film or the organic film formed on the upper and lower substrates is performed.

After S220 is completed, a seal pattern is formed at an edge of the upper substrate except for a liquid crystal injection inlet to serve as an adhesive, and a spacer is scattered on the lower substrate (S230).

The spacer may be a ball spacer or a column spacer. The column spacer may be formed by forming and patterning an organic film of an acryl, a BCB or the like.

Next, in S240, the two prepared substrates are attached to oppose each other (S240). When attaching the two substrates, a preciseness of a few micrometers is required to prevent light from being leaked when the preciseness is out of the given value.

In addition to the aforementioned injection method, a dispensing method may be used in which a liquid crystal is dropped on at least one substrate of the upper and lower substrates and then the two substrates are attached.

The process for forming the liquid crystal layer using the dispensing method provides an effect in the enhancement of the production by reducing the forming time of the liquid crystal layer as the liquid crystal display panel is large-sized.

At this time, the seal pattern may be formed in a closed structure because it does not need a liquid crystal injection inlet. A thermosetting sealant or a sealant where the UV-hardening property and the thermosetting property are mixed may be applied. The sealant where the UV-hardening property and the thermosetting property are mixed may be cured through UV-irradiation and thermal curing (or heating).

At S250, a cell-cutting step for cutting the opposing substrates attached into a plurality of unit cells is performed. The cell-cutting (S250) may be performed to cut the completely attached substrates to a necessary size, and includes a scribing step for forming a cutting line on the outer surfaces of the upper and lower substrates, and a breaking step for dividing the attached substrates into unit cells by applying a crack on the scribed line.

Finally in S260, a liquid crystal may be injected into a space between the two substrates cut in a unit cell, and a liquid crystal injection inlet is sealed to prevent the injected liquid crystal from being leaked, thereby completing an LCD.

As previously described, an IPS mode LCD may be fabricated by irradiating an ion beam onto a passivation film or an overcoat layer. However, a fabrication method of an IPS mode LCD according to the present invention is not limited only to the above described method, and various modifications and variations can be made in the present invention without departing from the scope of the present invention.

According to the present invention, an orientation treatment in an IPS mode LCD may be performed by irradiating an ion beam onto an inorganic film or organic film without the need for a separate orientation film printing process. The method of the present invention results in lower fabrication costs, and fabrication yield may be enhanced by the simplified the fabrication method.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A method of fabricating an IPS mode LCD, comprising:
   forming a gate line and a data line on a first substrate;
   forming a thin film transistor at a crossing point of the gate line and the data line;
   forming a pixel electrode and a common electrode on the first substrate;
   forming a passivation film on the pixel electrode and the common electrode;
   performing an orientation treatment of the passivation film by irradiating an ion beam on the passivation film;
   forming a black matrix layer on a second substrate;
   forming a color filter layer on the black matrix layer;
   forming an overcoat layer on the color filter layer; and performing an orientation treatment of the overcoat layer by irradiating an ion beam on the passivation film, wherein the pixel electrode, the common electrode and the gate line are arranged in a zigzag configuration, wherein irradiating the ion beam comprises: generating a plasma from an ion beam source, forming an ion beam from the plasma, accelerating the ion beam by applying an electric field to an ion beam acceleration medium; and irradiating the ion beam on one of the first and second substrates at a predetermined angle.

2. The method according to claim 1, further comprising forming a liquid crystal layer between the first and second substrates.

3. The method according to claim 2, wherein forming a liquid crystal layer includes injecting the liquid crystal into a space between the first and second substrates.

4. The method according to claim 2, wherein forming a liquid crystal layer includes dispensing a liquid crystal on at least one of the first and second substrates.

5. The method according to claim 1, wherein the passivation film and the overcoat layer include one of an organic material and an inorganic material.

6. The method according to claim 5, wherein the passivation film and the overcoat layer are formed of one of a photo-acryl, a BCB (benzo cyclobutine), and a silicon oxide (SiOx) and a silicon nitride (SiNx).

* * * * *